US 11,156,410 B2

(12) United States Patent
Liu

(10) Patent No.: US 11,156,410 B2
(45) Date of Patent: Oct. 26, 2021

(54) ENERGY STORAGE DEVICE

(71) Applicant: IHI Corporation, Koto-ku (JP)

(72) Inventor: Zhihong Liu, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 16/744,267

(22) Filed: Jan. 16, 2020

(65) Prior Publication Data

US 2020/0149825 A1     May 14, 2020

Related U.S. Application Data

(63) Continuation of application No. PCT/JP2018/038493, filed on Oct. 16, 2018.

(30) Foreign Application Priority Data

Nov. 16, 2017    (JP) .............................. JP2017-221076

(51) Int. Cl.
     *F01K 3/18*      (2006.01)
     *F28D 20/00*      (2006.01)
     *F28D 19/02*      (2006.01)

(52) U.S. Cl.
     CPC ................ *F28D 20/00* (2013.01); *F01K 3/18* (2013.01); *F28D 19/02* (2013.01)

(58) Field of Classification Search
     CPC ...... F02C 6/16; F02C 1/04; F02C 6/14; F01K 3/00
See application file for complete search history.

(56) References Cited

U.S. PATENT DOCUMENTS

| | | | |
|---|---|---|---|
| 3,973,552 A | | 8/1976 | Earvin, Jr. |
| 4,055,948 A | * | 11/1977 | Kraus ..................... F24S 80/20 |
| | | | 60/641.8 |

(Continued)

FOREIGN PATENT DOCUMENTS

| | | |
|---|---|---|
| CN | 102869854 A | 1/2013 |
| CN | 103261787 A | 8/2013 |

(Continued)

OTHER PUBLICATIONS

JP-11230517-A English Translation (Year: 1999).*

(Continued)

*Primary Examiner* — Shafiq Mian
(74) *Attorney, Agent, or Firm* — Oblon, McClelland, Maier & Neustadt, L.L.P.

(57) ABSTRACT

Provided is an energy storage device, including: a first heat exchanger configured to exchange heat between gas and solid particles; a gas supplier configured to supply gas to the first heat exchanger; a heater configured to consume power to heat any one of or both of gas fed from the gas supplier to be supplied to the first heat exchanger and gas present in the first heat exchanger; a solid-gas separator configured to separate gas and solid in a solid-gas mixture discharged from the first heat exchanger; a high-temperature tank and a low-temperature tank each configured to store the solid particles separated by the solid-gas separator; a first heat utilization device configured to use thermal energy of the gas separated by the solid-gas separator; a high-temperature particle supplier configured to supply the solid particles stored in the high-temperature tank to the first heat exchanger; and a low-temperature particle supplier configured to supply the solid particles stored in the low-temperature tank to the first heat exchanger.

13 Claims, 8 Drawing Sheets

(56) References Cited

U.S. PATENT DOCUMENTS

| | | | |
|---|---|---|---|
| 4,089,744 A | 5/1978 | Cahn | |
| 4,218,290 A * | 8/1980 | Phillips | C02F 1/10 203/11 |
| 4,229,184 A * | 10/1980 | Gregg | C10J 3/20 48/62 R |
| 4,361,009 A | 11/1982 | Schluderberg | |
| 9,347,690 B2 * | 5/2016 | Ma | F28D 20/0056 |
| 2008/0219651 A1 | 9/2008 | Nayef | |
| 2013/0257056 A1 * | 10/2013 | Ma | H02K 7/1823 290/52 |
| 2014/0158030 A1 * | 6/2014 | Jadhav | C01B 13/08 110/345 |
| 2016/0177822 A1 * | 6/2016 | Howes | F02C 3/04 60/785 |
| 2016/0222830 A1 * | 8/2016 | Aga | F25B 30/00 |
| 2017/0226900 A1 * | 8/2017 | Sanz | F28D 20/02 |

FOREIGN PATENT DOCUMENTS

| | | |
|---|---|---|
| CN | 104214061 A | 12/2014 |
| CN | 105890221 A | 8/2016 |
| CN | 106415181 A | 2/2017 |
| CN | 107110024 A | 8/2017 |
| DE | 101 49 806 A1 | 4/2003 |
| EP | 3 054 155 A1 | 8/2016 |
| GB | 2494400 A | 3/2013 |
| JP | 56-082388 A | 7/1981 |
| JP | 60-003159 B2 | 1/1985 |
| JP | 11-230517 A | 8/1999 |
| JP | 11230517 A * | 8/1999 |
| JP | 2016-142272 A | 8/2016 |
| JP | 2016-166705 A | 9/2016 |
| MA | 38821 A1 | 11/2016 |
| WO | WO 2006/072178 A1 | 7/2006 |
| WO | WO 2014/022451 A1 | 2/2014 |
| WO | WO 2017/044658 A1 | 3/2017 |

OTHER PUBLICATIONS

Combined Chinese Office Action and Search Report dated Oct. 10, 2020 in Patent Application No. 201880049162.0 (with English translation of Categories of Cited Documents), 7 pages.
International Search Report dated Dec. 11, 2018 in PCT/JP2018/038493 filed on Oct. 16, 2018 (with English Translation), 3 pages.
Extended European Search Report dated Aug. 9, 2021 issued in European patent application No. 18 87 8788.

* cited by examiner

ENERGY STORAGE DEVICE

CROSS REFERENCE TO RELATED APPLICATIONS

This application claims the benefit of priority to Japanese Patent Application No. 2017-221076 filed on Nov. 16, 2017, and contents thereof are incorporated herein.

BACKGROUND ART

Technical Field

The present disclosure relates to an energy storage device.

Related Art

An amount of generated power (hereinafter referred to as "generated power amount") and an amount of demand power (hereinafter referred to as "demand power amount") do not always match. Therefore, surplus power may be generated ("generated power amount"–"demand power amount">0) or power may be required ("generated power amount"–"demand power amount"<0, for example, power shortage occurs) in some cases. Particularly in power generation using renewable energy such as wind power generation and solar power generation, the amount of surplus power and the amount of power shortage are large.

In view of this, there has been developed a device including a brick block containing electric heaters and having flow paths formed therein (for example, Patent Literature 1). In the technology of Patent Literature 1, the electric heaters are driven when surplus power is generated so as to heat the brick block to store the heat. Then, in the technology of Patent Literature 1, when power is required (for example, when power shortage occurs), water is caused to flow through the flow paths so that the water is heated by the stored heat. Subsequently, in the technology of Patent Literature 1, power is generated by rotating a turbine through use of the heated water (steam).

CITATION LIST

Patent Literature

Patent Literature 1: US 2008/0219651 A

SUMMARY

Technical Problem

In order to stabilize a power grid (to achieve a smart grid), there is known a technology of converting surplus power into heat and storing the heat so that the stored heat can be used as required. In this technology, there is a demand for development in a technology of efficiently storing the heat or efficiently using the stored heat.

The present disclosure has been made in view of the above-mentioned problems, and has an object to provide an energy storage device capable of converting power into heat and efficiently storing the heat so that the heat can be efficiently used as required.

Solution to Problem

In order to solve the above-mentioned problem, according to the present disclosure, there is provided an energy storage device, including: a first heat exchanger to be supplied with gas from a gas supply port formed in a bottom surface or a lower portion of the first heat exchanger, and to be supplied with solid particles from above the gas supply port, the first heat exchanger being configured to exchange heat between the gas and the solid particles; a gas supplier configured to supply gas to the first heat exchanger; a heater configured to consume power to heat any one of or both of gas fed from the gas supplier to be supplied to the first heat exchanger and gas present in the first heat exchanger; a solid-gas separator configured to separate gas and solid in a solid-gas mixture discharged from the first heat exchanger; a high-temperature tank and a low-temperature tank each configured to store the solid particles separated by the solid-gas separator; a first heat utilization device configured to use thermal energy of the gas separated by the solid-gas separator; a high-temperature particle supplier configured to supply the solid particles stored in the high-temperature tank to the first heat exchanger; and a low-temperature particle supplier configured to supply the solid particles stored in the low-temperature tank to the first heat exchanger.

The energy storage device may further include a controller configured to control the gas supplier, the heater, and the low-temperature particle supplier, wherein the controller may be configured to, in a predetermined heat storage mode: control the gas supplier to supply gas to the first heat exchanger; drive the heater to heat the gas; and control the low-temperature particle supplier to supply the solid particles from the low-temperature tank to the first heat exchanger, so that the solid particles are heated by the gas in the first heat exchanger, and the solid particles separated by the solid-gas separator are supplied to the high-temperature tank.

The controller may be configured to, in the heat storage mode, adjust an amount of the solid particles to be supplied by the low-temperature particle supplier based on a predetermined surplus power amount.

The gas supplier may be configured to, in the heat storage mode, cause the gas to pass through the solid particles stored in the low-temperature tank, and then supply the gas to the first heat exchanger.

The energy storage device may further include a controller configured to control the gas supplier, the heater, and the high-temperature particle supplier, wherein the controller may be configured to, in a predetermined heat radiation mode: stop the heater; control the gas supplier to supply gas to the first heat exchanger; and control the high-temperature particle supplier to supply the solid particles from the high-temperature tank to the first heat exchanger, so that the gas is heated by the solid particles in the first heat exchanger, the solid particles separated by the solid-gas separator are supplied to the low-temperature tank, and the gas separated by the solid-gas separator is supplied to the first heat utilization device.

The gas supplier may be configured to, in the heat radiation mode, cause the gas to pass through the solid particles stored in the low-temperature tank, and then supply the gas to the first heat exchanger.

The controller may be configured to, in the heat radiation mode, adjust an amount of the solid particles to be supplied by the high-temperature particle supplier based on a demand temperature of gas required by the first heat utilization device.

The controller may be configured to, in the heat radiation mode, control the low-temperature particle supplier to supply the solid particles from the low-temperature tank to the first heat exchanger.

Any one of or both of the high-temperature particle supplier and the low-temperature particle supplier may include: a plurality of pipes that differ in flow rates of solid particles passing therethrough; and a plurality of valves provided in the plurality of pipes, respectively, and wherein the controller may be configured to control opening and closing of each of the plurality of valves.

The low-temperature tank may include: a low-temperature accommodating portion for accommodating the solid particles; and a fluidizing gas supplier configured to supply fluidizing gas from a bottom surface or a lower portion of the low-temperature accommodating portion.

The heater may be provided at any one of or both of a wall of the first heat exchanger and an interior of the first heat exchanger.

The energy storage device may further include: a second heat exchanger configured to exchange heat between fluid and the solid particles separated by the solid-gas separator; and a fluid supplier configured to supply the fluid subjected to heat exchange by the second heat exchanger to any one of or both of the first heat utilization device and the second heat utilization device, wherein the low-temperature tank may be configured to store the solid particles subjected to heat exchange by the second heat exchanger.

The heater may be configured to consume power generated by any one of or both of a power generation system using renewable energy and a power generation system using a turbine generator.

Effects of Disclosure

According to the present disclosure, an energy storage device is capable of converting power into heat and efficiently storing the heat so that the heat can be efficiently used as required.

DESCRIPTION OF EMBODIMENTS

Figure 1:
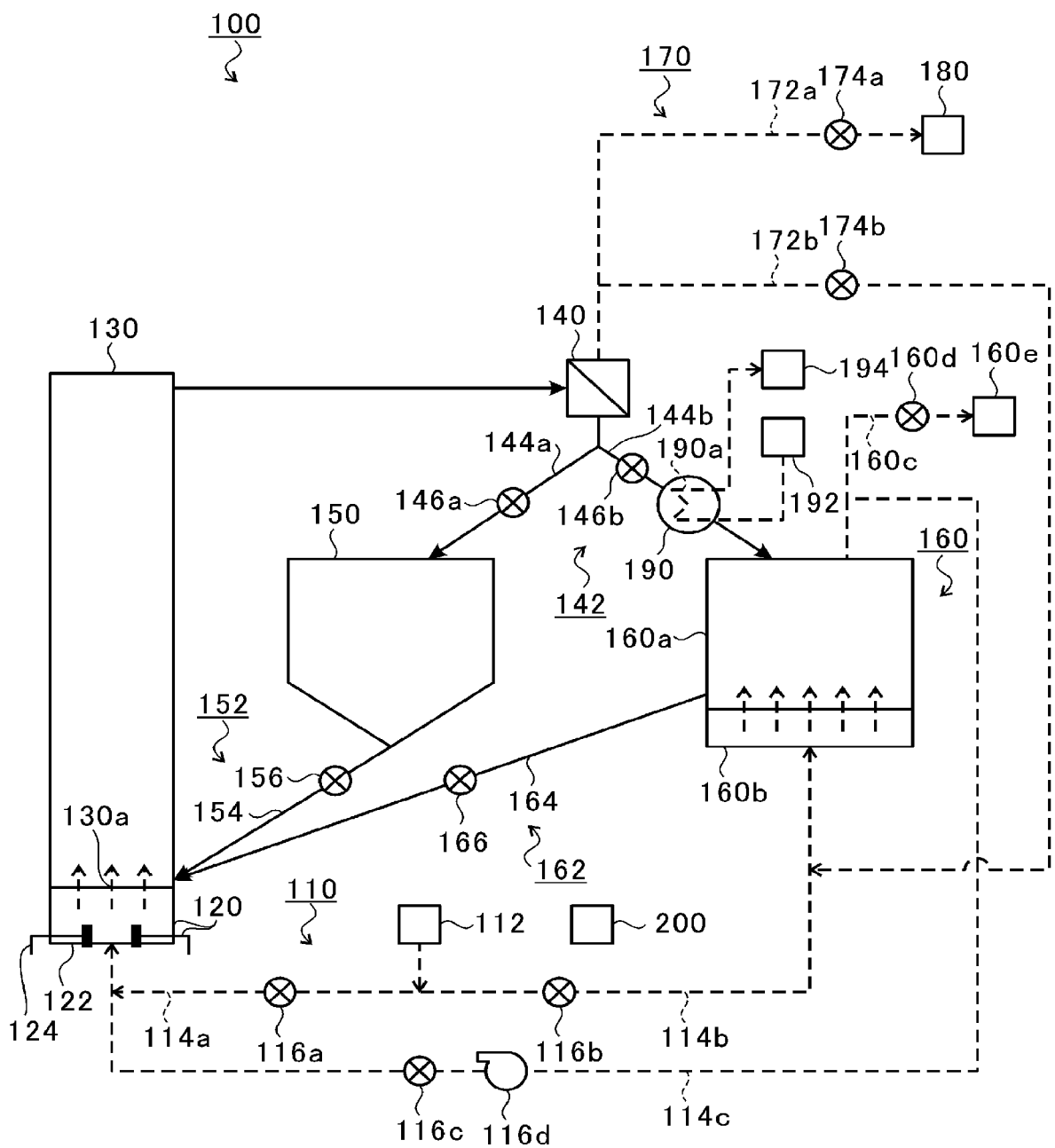
FIG. 1 is a view for illustrating an energy storage device.

Now, with reference to the attached drawings, one embodiment of the present disclosure is described in detail. The dimensions, materials, and other specific numerical values represented in the embodiment are merely examples used for facilitating the understanding of the disclosure, and do not limit the present disclosure otherwise particularly noted. Elements having substantially the same functions and configurations herein and in the drawings are denoted by the same reference symbols to omit redundant description thereof. Further, illustration of elements with no direct relationship to the present disclosure is omitted.

[Energy Storage Device 100]

FIG. 1 is a view for illustrating an energy storage device 100. As illustrated in FIG. 1, the energy storage device 100 includes a gas supplier 110, a heating chamber 120, a first heat exchanger 130, a solid-gas separator 140, a distributor 142, a high-temperature tank 150, a high-temperature particle supplier 152, a low-temperature tank 160, a low-temperature particle supplier 162, a gas feeder 170, a first heat utilization device 180, a second heat exchanger 190, a fluid supplier 192, a second heat utilization device 194, and a controller 200. In FIG. 1, the solid-line arrows indicate a flow of solid particles and a solid-gas mixture. In FIG. 1, the broken-line arrows indicate a flow of fluid.

The gas supplier 110 supplies gas (for example, air) to the heating chamber 120, which is described later. The gas supplier 110 includes a blower 112, pipes 114a, 114b, and 114c, valves 116a, 116b, and 116c, and a blower 116d. The blower 112 has an intake side connected to a gas supply source, and an ejection side connected to the pipe 114a. The pipe 114a connects the blower 112 and the heating chamber 120 to each other. The valve 116a is provided in the pipe 114a. The pipe 114b is branched from a portion between the blower 112 and the valve 116a in the pipe 114a to be connected to a wind box 160b of the low-temperature tank 160, which is described later. The valve 116b is provided in the pipe 114b. The pipe 114c connects a low-temperature accommodating portion 160a of the low-temperature tank 160, which is described later, and the heating chamber 120 to each other. The valve 116c is provided in the pipe 114c. The blower 116d is provided on upstream of the valve 116c in the pipe 114c.

The heating chamber 120 includes a box member 122 and a heater 124. The box member 122 is a hollow container. The box member 122 has an upper surface formed of a permeable distributor. The upper surface of the box member 122 also functions as a bottom surface of the first heat exchanger 130, which is described later. The box member 122 is supplied with gas from the gas supplier 110 (blower 112). The heater 124 consumes power to heat the gas. Examples of the heater 124 include a resistance heating device (device configured to use heat generated from a conductor supplied with power) and an arc heating device (device configured to use heat generated at the time of arc discharge).

The heater 124 can consume power generated by any one of or both of a power generation system using renewable energy and a power generation system using a turbine generator. Examples of the power generation system using renewable energy include a solar thermal power generation system, a solar power generation system, a wind power generation system, and a hydroelectric power generation system. When the heater 124 consumes power generated by the power generation system using renewable energy, power that often becomes surplus power can be efficiently converted into heat.

The heater 124 is arranged in the box member 122. The heater 124 heats the gas supplied into the box member 122. Therefore, when the heater 124 is driven, the gas supplied from the gas supplier 110 into the box member 122 is heated by the heater 124, and is then supplied to the first heat exchanger 130.

The first heat exchanger 130 is supplied with gas and solid particles from the bottom surface or a lower portion thereof, and exchanges heat between the gas and the solid particles. The solid particles are made of a material having a melting point that is higher than a demand temperature of the first heat utilization device 180, which is described later.

Examples of the solid particles include silica, alumina, barite sand (barite or barium sulfate), partially calcined clay, glass beads, and collected petroleum catalyst. The solid particles are preferably any one of or both of silica and alumina. When the solid particles are silica, the cost required for the solid particles can be reduced. Further, when desert sand or river sand is used as the solid particles (silica), the solid particles are easily obtainable at low cost. Further, when the solid particles are alumina having a relatively high melting point, the temperature of the solid particles can be set high, and hence a high energy storage density can be achieved.

The solid particles are particles having a particle diameter of 0.01 mm or more and 10 mm or less. The shape of the solid particles is not limited, and may be a spherical shape or a shape other than the spherical shape.

In this embodiment, the first heat exchanger 130 is a hollow container. Inside the first heat exchanger 130, a heater or a heat exchanger may be installed. The first heat exchanger 130 is supplied with solid particles from the high-temperature tank 150 and the low-temperature tank 160, which are described later. Further, as described above, the first heat exchanger 130 is supplied with gas from the gas supplier 110 via the heating chamber 120. A flow velocity of the gas to be supplied by the gas supplier 110 to the first heat exchanger 130 is equal to or larger than a terminal velocity of the solid particles in the first heat exchanger 130. Further, the solid particles are supplied from above a gas supply port 130a formed in the distributor arranged at the bottom surface of the first heat exchanger 130. Therefore, the solid-gas mixture of solid particles and gas passes through the first heat exchanger 130 from a lower portion toward an upper portion (from the bottom surface toward an upper surface). Further, in the first heat exchanger 130, the solid-gas mixture is formed of the solid particles and the gas, and the solid particles and the gas are strongly stirred. Therefore, the solid particles and the gas are efficiently brought into contact with each other to exchange heat therebetween.

The solid-gas separator 140 separates the solid and the gas of the solid-gas mixture discharged from the first heat exchanger 130. Examples of the solid-gas separator 140 include a cyclone and a filter. The distributor 142 distributes the solid particles separated by the solid-gas separator 140 to the high-temperature tank 150 or the low-temperature tank 160. The distributor 142 includes pipes 144a and 144b and valves 146a and 146b. The pipe 144a connects a discharge port for discharging solid particles of the solid-gas separator 140 and the high-temperature tank 150 to each other. The valve 146a is provided in the pipe 144a. The pipe 144b connects the discharge port for discharging solid particles of the solid-gas separator 140 and the low-temperature tank 160 to each other. The valve 146b is provided in the pipe 144b. The valve 146a and the valve 146b are exclusively opened and closed by the controller 200, which is described later.

The high-temperature tank 150 stores the solid particles separated by the solid-gas separator 140. Examples of the high-temperature tank 150 include a hopper. The high-temperature particle supplier 152 supplies the solid particles stored in the high-temperature tank 150 to the first heat exchanger 130. The high-temperature particle supplier 152 includes a pipe 154 and a flow rate adjustment valve 156. The pipe 154 connects a lower portion of the high-temperature tank 150 and the lower portion of the first heat exchanger 130 to each other. The flow rate adjustment valve 156 is provided in the pipe 154.

The low-temperature tank 160 stores the solid particles separated by the solid-gas separator 140. The low-temperature tank 160 is supplied with the solid particles at a timing different from that of the high-temperature tank 150. The low-temperature tank 160 includes the low-temperature accommodating portion 160a, the wind box 160b (fluidizing gas supplier), an exhaust pipe 160c, and a check valve 160d. The low-temperature accommodating portion 160a accommodates the solid particles supplied by the distributor 142. The low-temperature accommodating portion 160a is a hollow container. The wind box 160b is provided below the low-temperature accommodating portion 160a. An upper portion of the wind box 160b is formed of a permeable distributor. The upper portion of the wind box 160b also functions as a bottom surface of the low-temperature accommodating portion 160a. The wind box 160b is supplied with fluidizing gas (for example, air) from the gas supplier 110 (blower 112) or the solid-gas separator 140. The fluidizing gas supplied to the wind box 160b is supplied into the low-temperature accommodating portion 160a from the bottom surface of the low-temperature accommodating portion 160a (distributor).

The flow velocity of the fluidizing gas to be supplied from the gas supplier 110 to the low-temperature accommodating portion 160a is equal to or larger than the minimum fluidization velocity of the solid particles and smaller than the scattering velocity of the solid particles. Further, the flow velocity of the fluidizing gas to be supplied from the solid-gas separator 140 to the low-temperature accommodating portion 160a is equal to or larger than the minimum fluidization velocity of the solid particles and smaller than the terminal velocity of the solid particles. Therefore, the solid particles supplied from the solid-gas separator 140 is fluidized by the fluidizing gas to form a fluidized bed (bubbling fluidized bed) in the low-temperature accommodating portion 160a. Further, the flow velocity of the fluidizing gas to be supplied from the solid-gas separator 140 to the low-temperature accommodating portion 160a is smaller than the terminal velocity, and hence the solid particles do not scatter from the low-temperature accommodating portion 160a.

The exhaust pipe 160c connects the low-temperature accommodating portion 160a and a pressure energy collector 160e to each other. The check valve 160d is provided in the exhaust pipe 160c. The check valve 160d is opened when the pressure in the low-temperature accommodating portion 160a becomes equal to or larger than a predetermined pressure. When the low-temperature accommodating portion 160a is in a pressurized state, the pressure of the gas to be exhausted from the exhaust pipe 160c is equal to or larger than the atmospheric pressure. In this case, the pressure energy collector 160e is, for example, a turbine.

The low-temperature particle supplier 162 supplies the solid particles stored in the low-temperature tank 160 to the first heat exchanger 130. The low-temperature particle supplier 162 includes a pipe 164 and a flow rate adjustment valve 166. The pipe 164 connects a lower portion of the low-temperature accommodating portion 160a and the lower portion of the first heat exchanger 130 to each other. The flow rate adjustment valve 166 is provided in the pipe 164.

The gas feeder 170 supplies the gas separated by the solid-gas separator 140 to the first heat utilization device 180 or the wind box 160b. The gas feeder 170 includes pipes 172a and 172b and valves 174a and 174b. The pipe 172a connects a gas exhaust port of the solid-gas separator 140 and the first heat utilization device 180 to each other. The valve 174a is provided in the pipe 172a. The pipe 172b connects the gas exhaust port of the solid-gas separator 140 and the wind box 160b to each other. The valve 174b is provided in the pipe 172b.

The first heat utilization device 180 is a device configured to use thermal energy of the gas separated by the solid-gas separator 140. Examples of the first heat utilization device 180 include a gas turbine generator, a steam turbine generator (boiler), a boiler configured to provide steam, a fireplace (furnace or kiln), and an air conditioner.

The second heat exchanger 190 is provided between the valve 146b and the low-temperature accommodating portion 160a in the pipe 144b. The second heat exchanger 190 exchanges heat between the solid particles passing through the pipe 144b and fluid (for example, water, steam, air, and combustion exhaust gas). The second heat exchanger 190 may be configured to form a fluidized bed of solid particles, or may be configured to form a moving bed of solid particles. The second heat exchanger 190 includes a heat transfer pipe 190a. The heat transfer pipe 190a passes through the solid particles (through the fluidized bed or the moving bed of the solid particles). The fluid passes through the heat transfer pipe 190a. The fluid supplier 192 causes the fluid to pass through the second heat exchanger 190, and supplies the fluid subjected to heat exchange (heated) by the second heat exchanger 190 to the second heat utilization device 194. The fluid supplier 192 is, for example, a pump.

The second heat utilization device 194 is a device configured to use thermal energy of the fluid heated by the second heat exchanger 190. Examples of the second heat utilization device 194 include a gas turbine generator, a steam turbine generator (boiler), a boiler configured to provide steam, a fireplace (furnace or kiln), and an air conditioner.

The controller 200 is formed of a semiconductor integrated circuit including a central processing unit (CPU). The controller 200 reads out, for example, a program or parameters for operating the CPU itself from a ROM. The controller 200 cooperates with a RAM or other electronic circuits serving as a work area to manage and control the entire energy storage device 100. In this embodiment, the controller 200 controls the gas supplier 110 (blower 112, valves 116a, 116b, and 116c, and blower 116d), the heater 124, the distributor 142 (valves 146a and 146b), the high-temperature particle supplier 152 (flow rate adjustment valve 156), the low-temperature particle supplier 162 (flow rate adjustment valve 166), the gas feeder 170 (valves 174a and 174b), and the fluid supplier 192.

In this embodiment, during a period in which surplus power is generated ("generated power amount"–"demand power amount">"predetermined value" (for example, 0)), the controller 200 converts the surplus power into thermal energy and stores the thermal energy (heat storage mode). On the other hand, when heat or power is required, the controller 200 causes the first heat utilization device 180 or the second heat utilization device 194 to use the stored thermal energy (heat radiation mode). In an initial state, the blowers 112 and 116d, the heater 124, and the fluid supplier 192 are stopped, and the valves 116a, 116b, 116c, 146a, 146b, 174a, and 174b and the flow rate adjustment valves 156 and 166 are closed. Further, in the initial state, the solid particles are stored in the low-temperature tank 160 (low-temperature accommodating portion 160a). Now, processing to be performed by the controller 200 in each of the heat storage mode and the heat radiation mode is described.

[Heat Storage Mode]

Figure 2:
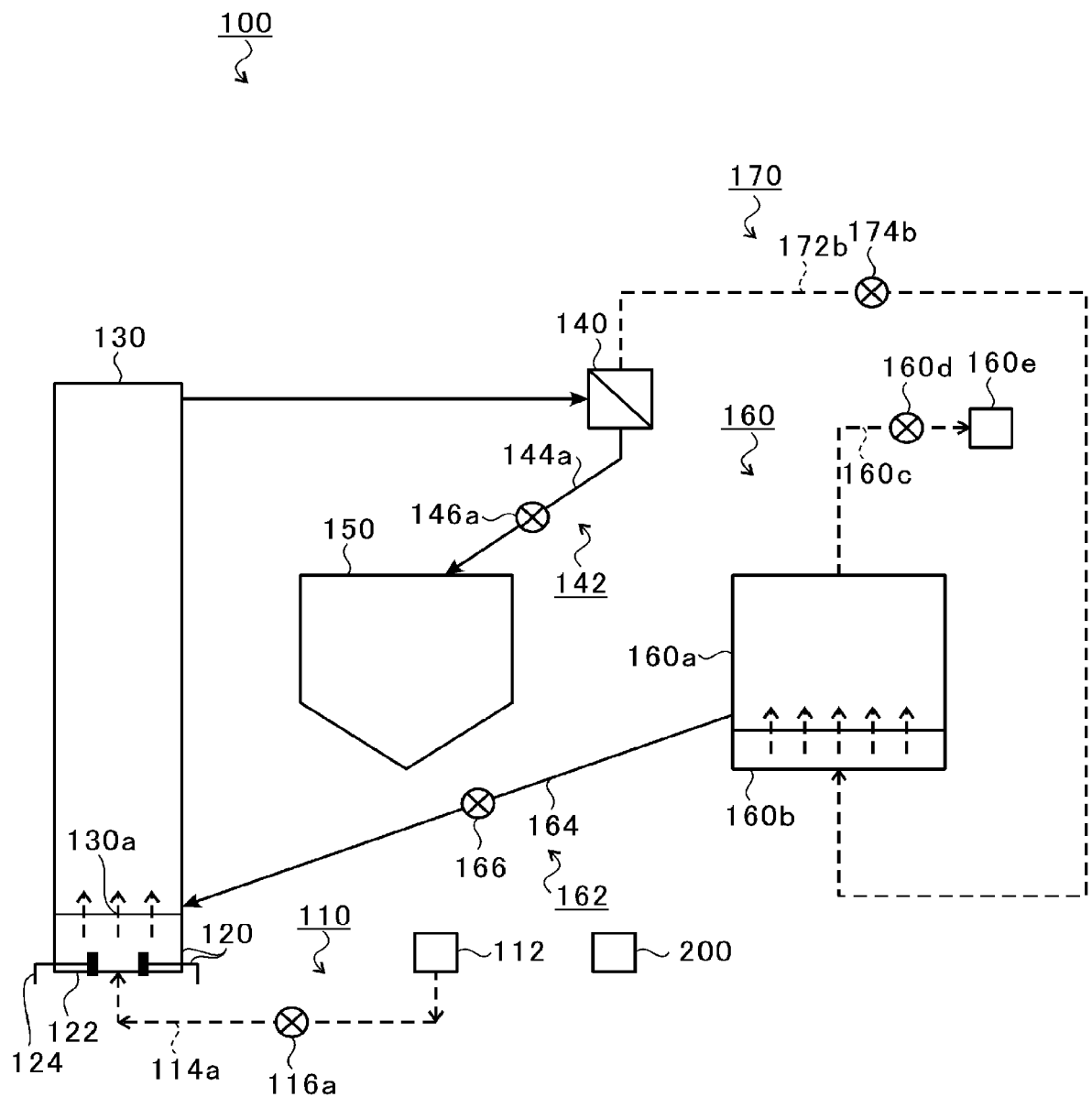
FIG. 2 is a view for illustrating processing to be performed by a controller in a heat storage mode.

FIG. 2 is a view for illustrating the processing to be performed by the controller 200 in the heat storage mode. For ease of understanding, in FIG. 2, configurations not used in the heat storage mode are omitted.

The controller 200 closes the valves 116b, 116c, 146b, and 174a and the flow rate adjustment valve 156. The controller 200 stops the blower 116d and the fluid supplier 192. Further, as illustrated in FIG. 2, the controller 200 drives the blower 112 and the heater 124. Further, the controller 200 opens the valves 116a, 146a, and 174b. The controller 200 opens the flow rate adjustment valve 166 and adjusts an opening degree of the flow rate adjustment valve 166.

In this case, surplus power is consumed by the heater 124. The gas supplied by the blower 112 to the heating chamber 120 is heated by the heater 124. The heater 124 heats the gas to a predetermined first temperature, which is lower than a heat resistance temperature of the solid particles, and which satisfies the demand temperature of the first heat utilization device 180. For example, the heater 124 heats the gas so that the solid particles heated by the gas are brought to a predetermined second temperature satisfying the demand temperature. When the solid particles are silica, the gas is heated to a temperature equal to or lower than 1,600° C. Further, the second temperature is lower than the first temperature, but the temperature difference therebetween is small (for example, about 50° C.).

The high-temperature gas (first-temperature gas) that has been heated as described above is supplied to the first heat exchanger 130. Further, low-temperature solid particles are supplied from the low-temperature accommodating portion 160a to the first heat exchanger 130. Therefore, in the first heat exchanger 130, the high-temperature gas and the low-temperature solid particles are strongly stirred, and heat is exchanged between the high-temperature gas and the low-temperature solid particles. In this manner, the solid particles are heated by the gas, and the gas is cooled by the solid particles. At the outlet of the first heat exchanger 130, the temperature of the solid particles and the temperature of the gas become substantially equal to each other (become the second temperature).

Then, the solid-gas separator 140 separates the solid and the gas in the solid-gas mixture discharged from the first heat exchanger 130. The separated high-temperature solid particles (second-temperature solid particles) are supplied to the high-temperature tank 150 through the pipe 144a. The high-temperature tank 150 stores the high-temperature solid particles. On the other hand, the separated second-temperature gas is supplied to the wind box 160b through the pipe 172b. The second-temperature gas supplied to the wind box 160b is used to fluidize the solid particles accommodated in the low-temperature accommodating portion 160a. Further, with the second-temperature gas, the solid particles accommodated in the low-temperature accommodating portion 160a are heated to a fourth temperature (fourth temperature is lower than a third temperature, which is described later, but higher than room temperature (for example, 25° C.)). That is, the solid particles accommodated in the low-temperature accommodating portion 160a can collect part of heat of the gas discharged from the first heat exchanger 130.

As described above, in the heat storage mode, surplus power is converted into heat, and the heat is first transferred to gas. Then, heat is exchanged between the high-temperature gas and the low-temperature solid particles so that heat is transferred to the solid particles. As described above, surplus power is converted into thermal energy, and the thermal energy is held (stored) by the solid particles. The heat capacity of the solid particles is larger than that of gas (air), and hence the heat storage density ($J/m^3$) of the solid particles is higher than that of gas.

The controller 200 adjusts the opening degree of the flow rate adjustment valve 166 based on the amount of surplus power (hereinafter referred to as "surplus power amount"). Specifically, the amount of solid particles that are brought to the second temperature when the heater 124 converts the surplus power amount of power into thermal energy and heats the solid particles with this thermal energy (via the gas) is determined. Therefore, the controller 200 adjusts the opening degree of the flow rate adjustment valve 166 so that the determined amount of solid particles are supplied to the first heat exchanger 130.

In this manner, even when the surplus power amount varies (the surplus power amount temporally varies), the temperature of the solid particles to be stored in the high-temperature tank 150 can be maintained regularly to the second temperature. That is, the variation of the surplus power amount can be coped with. Therefore, in the heat radiation mode to be described later, the third-temperature gas satisfying the demand temperature can be supplied to the first heat utilization device 180 even without use of additional energy (for example, without combustion of supplemental fuel).

[Heat Radiation Mode]

Figure 3:
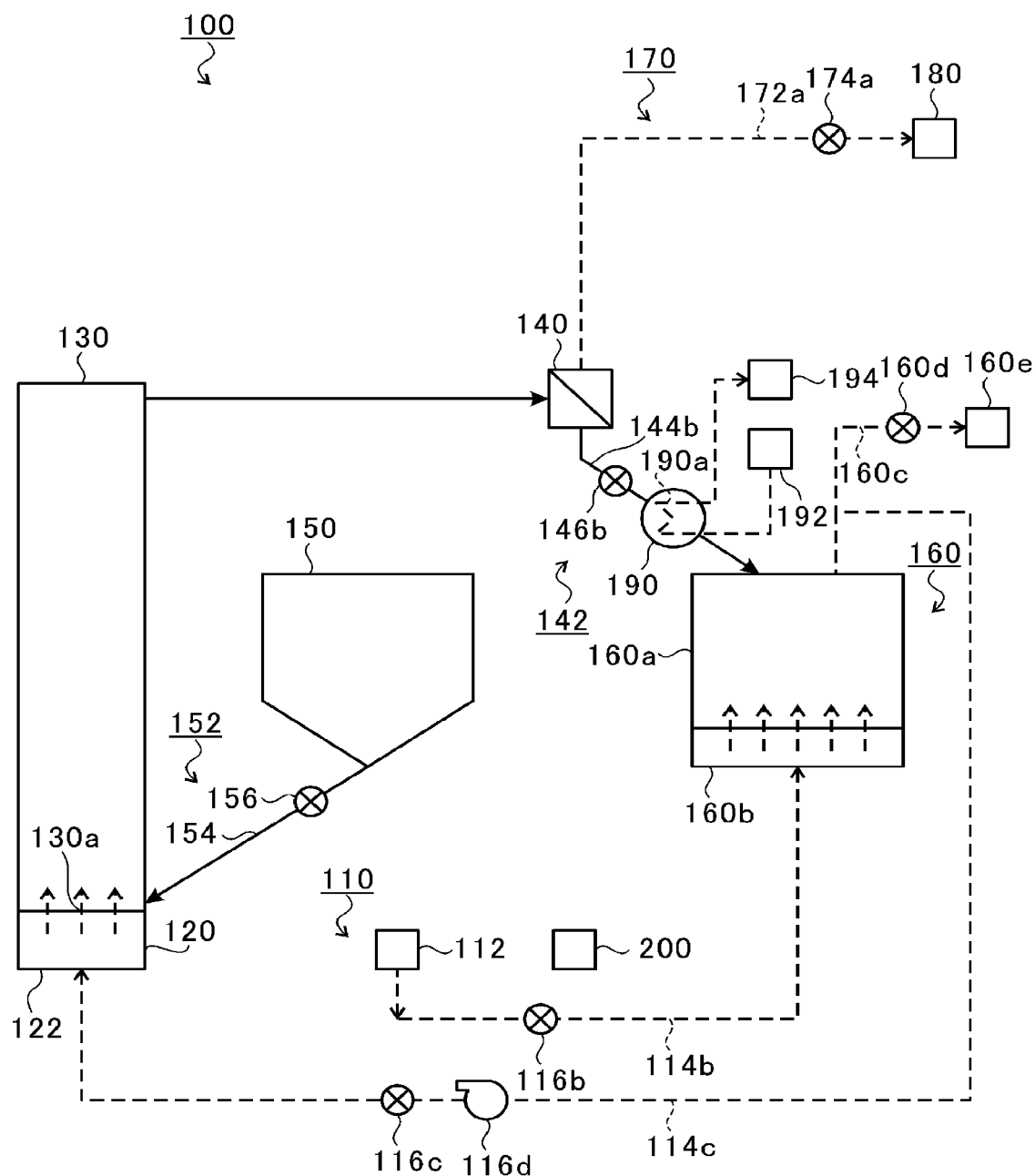
FIG. 3 is a view for illustrating processing to be performed by the controller in a heat radiation mode.

FIG. 3 is a view for illustrating the processing to be performed by the controller 200 in the heat radiation mode. For ease of understanding, in FIG. 3, configurations not used in the heat radiation mode are omitted.

The controller 200 closes the valves 116a, 146a, and 174b and the flow rate adjustment valve 166. The controller 200 stops the heater 124. Further, as illustrated in FIG. 3, the controller 200 opens the valves 116b, 116c, 146b, and 174a. Further, the controller 200 opens the flow rate adjustment valve 156 and adjusts an opening degree of the flow rate adjustment valve 156. The controller 200 drives the blowers 112 and 116d and the fluid supplier 192.

In this manner, gas is supplied from the blower 112 through the low-temperature tank 160 and the box member 122 to the first heat exchanger 130. The blower 112 supplies the gas at a demand flow rate of the first heat utilization device 180. Further, the first heat exchanger 130 is supplied with the high-temperature solid particles (second-temperature solid particles) from the high-temperature tank 150. Therefore, in the first heat exchanger 130, heat is exchanged between the low-temperature gas and the high-temperature solid particles. In this manner, the gas is heated by the solid particles, and the solid particles are cooled by the gas. The solid particles and the gas are discharged from the first heat exchanger 130 at substantially equal temperatures, which are the third temperature.

Then, the solid-gas separator 140 separates the solid and the gas in the solid-gas mixture discharged from the first heat exchanger 130. The separated high-temperature gas (third-temperature gas) is supplied to the first heat utilization device 180 through the pipe 172a. The third temperature is a predetermined temperature satisfying the demand temperature of the first heat utilization device 180, and is lower than the second temperature. In this manner, in the first heat utilization device 180, the thermal energy of the gas is used (for example, power is generated). On the other hand, the separated third-temperature solid particles are supplied to the low-temperature tank 160 (low-temperature accommodating portion 160a) through the pipe 144b. The low-temperature tank 160 stores the third-temperature solid particles.

As described above, in the heat radiation mode, heat is exchanged between the high-temperature solid particles and the low-temperature gas so that the heat is transferred to the gas. Then, when required (for example, during a period in which power shortage occurs), the high-temperature gas (third-temperature gas) is used by the first heat utilization device 180 (for example, power is generated).

The controller 200 adjusts the opening degree of the flow rate adjustment valve 156 based on the demand temperature and the demand flow rate of the first heat utilization device 180. Specifically, the amount of solid particles for heating the gas to the third temperature when the blower 112 supplies the gas at the demand flow rate of the first heat utilization device 180 and the second-temperature solid particles stored in the high-temperature tank 150 are used to heat the gas is determined. Therefore, the controller 200 adjusts the opening degree of the flow rate adjustment valve 156 so that the determined amount of solid particles are supplied to the first heat exchanger 130.

In this manner, the temperature of the gas to be supplied to the first heat utilization device 180 can be brought to the demand temperature of the first heat utilization device 180. Therefore, the third-temperature gas satisfying the demand temperature can be stably supplied to the first heat utilization device 180 even without use of additional energy (for example, without combustion of supplemental fuel). Even when the demand temperature (for example, the demanded power generation amount) of the first heat utilization device 180 temporally varies, the variation can be coped with by adjusting the supply amount of the solid particles.

Further, the fluid supplier 192 causes fluid to pass through the heat transfer pipe 190a of the second heat exchanger 190. In this case, heat is exchanged between the fluid and the solid particles passing through the pipe 144b. In this manner, the fluid heated by the solid particles is supplied to the second heat utilization device 194. Then, the second heat utilization device 194 uses the heat of the fluid (heat of the solid particles separated by the solid-gas separator 140). With this configuration including the second heat exchanger 190 and the fluid supplier 192, heat of the solid particles obtained after the gas is heated to the third temperature can be effectively used.

Further, the blower 112 does not directly supply the gas to the heating chamber 120 (first heat exchanger 130), but causes the gas to pass through the solid particles accommodated in the low-temperature accommodating portion 160a to supply the gas to the first heat exchanger 130 (via the solid particles). In this manner, the gas supplied to the first heat exchanger 130 can be preheated by the solid particles having the fourth temperature (for example, about 300° C. or more and about 400° C. or less). As described above, when the heat of the solid particles accommodated in the low-temperature accommodating portion 160a is used, the heat utilization efficiency can be improved. As a result, the output of the first heat utilization device 180 can be increased. For example, when the first heat utilization device 180 is a steam turbine generator or a gas turbine generator, the power generation efficiency can be improved.

As described above, the energy storage device 100 according to this embodiment converts surplus power into thermal energy and causes the solid particles to keep the thermal energy. In this manner, as compared to the related art configured to store the surplus power in a secondary battery or the related art configured to convert the surplus power into hydrogen, the energy can be kept at lower cost. Further, as compared to the related art configured to convert the surplus power into hydrogen to keep the energy, the kept energy can be converted into thermal energy or electric energy at higher speed as required (for example, when power shortage occurs).

Further, as compared to the related art configured to store heat with use of a brick block, in the heat storage mode, through adjustment of the amount of solid particles for storing heat, the solid particles having the designated second temperature can be stored even when surplus power varies. Further, in the heat radiation mode, the flow rate of the gas to be supplied by the blower 112 is set to the demand flow rate of the first heat utilization device 180, and the amount of solid particles to be supplied to the first heat exchanger 130 is adjusted. In this manner, the temperature of the gas to be supplied to the first heat utilization device 180 can be brought to the demand temperature of the first heat utilization device 180. Therefore, without use of supplemental fuel, temporal load variation of the first heat utilization device 180 can be coped with.

First Modification Example

In the above-mentioned embodiment, description has been given of an example of a configuration in which the flow rate adjustment valves 156 and 166 are mechanical valves (butterfly valves) whose opening degrees are adjustable. However, the flow rate adjustment valves 156 and 166 are not limited to this configuration as long as the flow rate of the solid particles passing therethrough can be adjusted.

Figure 4:
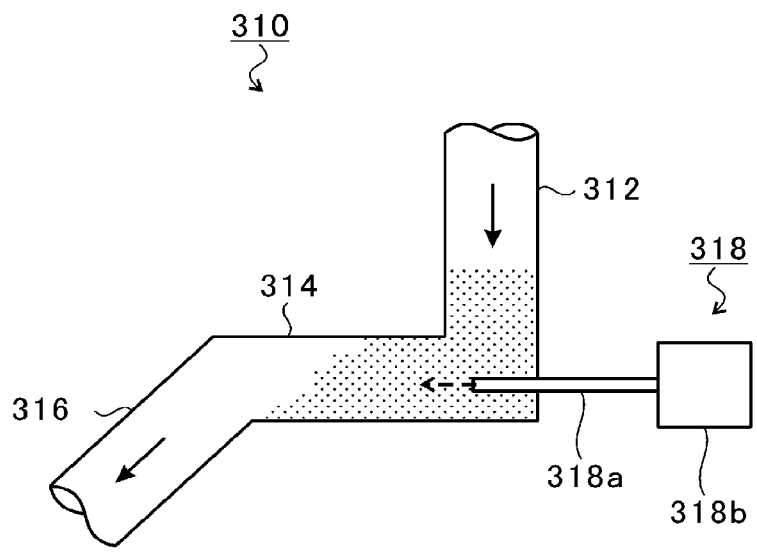
FIG. 4 is a view for illustrating a flow rate adjustment valve in a first modification example.

FIG. 4 is a view for illustrating a flow rate adjustment valve 310 in a first modification example. In this case, description is given of an example of a case in which the flow rate adjustment valve 310 is provided in place of the flow rate adjustment valve 156. However, the flow rate adjustment valve 310 may be provided in place of the flow rate adjustment valve 166.

As illustrated in FIG. 4, the flow rate adjustment valve 310 is an L-valve loop seal. Specifically, the flow rate adjustment valve 310 includes a vertical pipe 312, a horizontal pipe 314, a connection pipe 316, and a fluidizing gas supplier 318. The vertical pipe 312 is a pipe extending in the vertical direction. The vertical pipe 312 has an upper end connected to the high-temperature tank 150. The horizontal pipe 314 is a pipe extending in the horizontal direction. The horizontal pipe 314 is continuous with the vertical pipe 312. That is, the vertical pipe 312 and the horizontal pipe 314 form an L-shaped pipe. The connection pipe 316 is continuous with the horizontal pipe 314. The connection pipe 316 is connected to the first heat exchanger 130.

The fluidizing gas supplier 318 supplies gas to the vertical pipe 312 or the horizontal pipe 314. The fluidizing gas supplier 318 includes a nozzle 318a and a pump 318b. The nozzle 318a has an opening oriented so as to face the horizontal pipe 314. The pump 318b supplies gas to the nozzle 318a.

At the flow rate adjustment valve 310, the solid particles drop from the high-temperature tank 150 into the vertical pipe 312 to be deposited in the vertical pipe 312 and the horizontal pipe 314. In this case, when gas is supplied by the fluidizing gas supplier 318, the deposited solid particles are fluidized by the gas to be fed to the connection pipe 316.

The pump 318b is controlled by the controller 200. The controller 200 controls the flow rate of the gas to be supplied by the pump 318b so as to enable adjustment of the flow rate of the solid particles to be fed to the connection pipe 316.

When the flow rate adjustment valve 310 is an L-valve loop seal (non-mechanical valve), the flow rate of the solid particles can be adjusted even when the solid particles have a high temperature. Further, the L-valve loop seal has a simple structure, and hence maintenance of the flow rate adjustment valve 310 can be easily performed.

Second Modification Example

Figure 5:
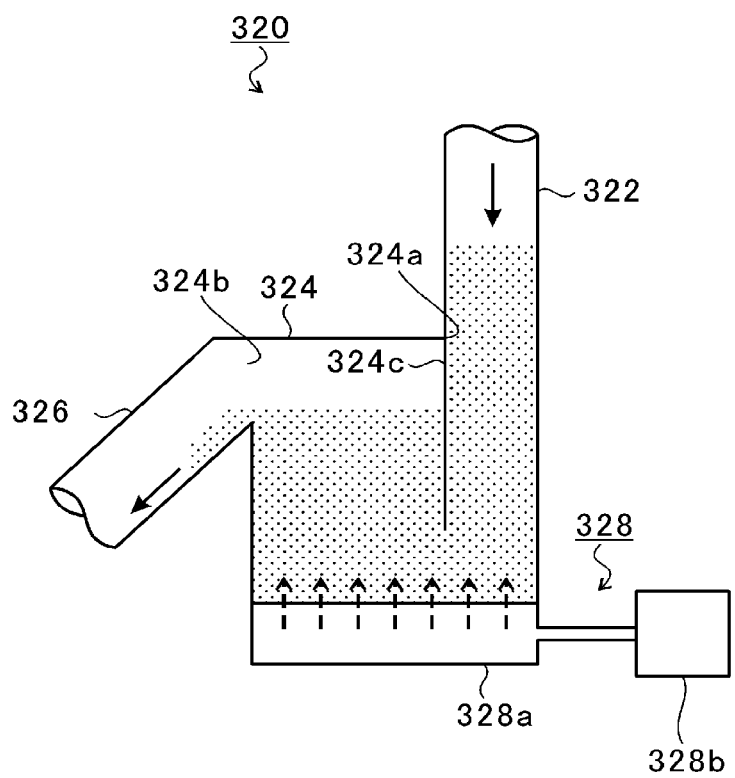
FIG. 5 is a view for illustrating a flow rate adjustment valve in a second modification example.

FIG. 5 is a view for illustrating a flow rate adjustment valve 320 in a second modification example. In this case, description is given of an example of a case in which the flow rate adjustment valve 320 is provided in place of the flow rate adjustment valve 156. However, the flow rate adjustment valve 320 may be provided in place of the flow rate adjustment valve 166.

As illustrated in FIG. 5, the flow rate adjustment valve 320 is a J-valve loop seal. Specifically, the flow rate adjustment valve 320 includes a vertical pipe 322, a pot portion 324, a connection pipe 326, and a fluidizing gas supplier 328.

The vertical pipe 322 is a pipe extending in the vertical direction. The vertical pipe 322 has an upper end connected to the high-temperature tank 150, and a lower end connected to an inlet 324a of the pot portion 324. The pot portion 324 is a hollow container. The pot portion 324 has the inlet 324a formed at its top. The pot portion 324 has an outlet 324b formed in its side surface. The pot portion 324 includes a partition plate 324c extending downward in the vertical direction from the top. The partition plate 324c partitions the inside of the pot portion 324 into a region in which the inlet 324a is formed and a region in which the outlet 324b is formed. Further, a distal end of the partition plate 324c is extended to be lower than a lower end of the outlet 324b in the vertical direction. The connection pipe 326 connects the outlet 324b of the pot portion 324 and the first heat exchanger 130 to each other.

The fluidizing gas supplier 328 supplies gas from a bottom surface of the pot portion 324. Specifically, the fluidizing gas supplier 328 includes a wind box 328a and a pump 328b. The wind box 328a is provided below the pot portion 324. An upper portion of the wind box 328a is formed of a permeable distributor. The upper portion of the wind box 328a also functions as the bottom surface of the pot portion 324. The wind box 328a is supplied with fluidizing gas (air) from the pump 328b. The fluidizing gas supplied to the wind box 328a is supplied into the pot portion 324 from the bottom surface (distributor) of the pot portion 324.

The flow velocity of the fluidizing gas to be supplied from the fluidizing gas supplier 328 to the pot portion 324 is equal to or larger than the minimum fluidization velocity of the solid particles and smaller than the scattering velocity of the solid particles. Therefore, the solid particles dropping from the high-temperature tank 150 through the vertical pipe 322 are fluidized by the fluidizing gas to form a fluidized bed (bubbling fluidized bed) in the pot portion 324.

Then, as the solid particles are further introduced from the high-temperature tank 150, the position of the fluidized bed in the vertical direction becomes higher. Then, the solid particles overflow from a lower end of the outlet 324b, and are fed to the connection pipe 326.

The on/off of the pump 328b is controlled by the controller 200. The controller 200 drives the pump 328b so that the solid particles are fed from the high-temperature tank 150 to the connection pipe 326. Further, the controller 200 stops the pump 328b so that the feeding of the solid particles from the high-temperature tank 150 to the connection pipe 326 is stopped.

When the flow rate adjustment valve 320 is a J-valve loop seal (non-mechanical valve), the solid particles can be supplied even when the solid particles have a high temperature.

Third Modification Example

Figure 6:
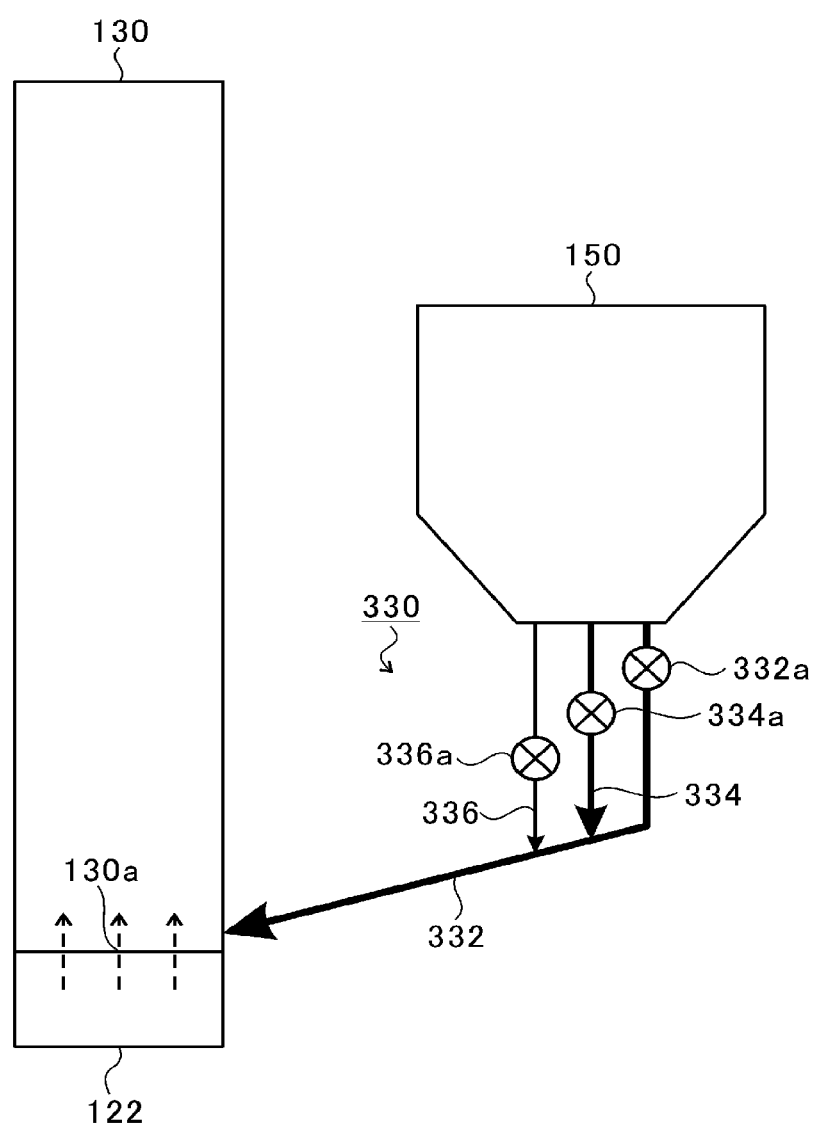
FIG. 6 is a view for illustrating a particle supplier in a third modification example.

FIG. 6 is a view for illustrating a particle supplier 330 in a third modification example. In this case, description is given of an example of a case in which the particle supplier 330 is provided in place of the high-temperature particle supplier 152. However, the particle supplier 330 may be provided in place of the low-temperature particle supplier 162.

As illustrated in FIG. 6, the particle supplier 330 includes a main pipe 332, a plurality of sub-pipes 334 and 336, and valves 332a, 334a, and 336a. The main pipe 332 connects the high-temperature tank 150 and the first heat exchanger 130 to each other. The valve 332a is provided in the main pipe 332. The sub-pipe 334 connects the high-temperature tank 150 and a portion between the valve 332a and the first heat exchanger 130 in the main pipe 332 to each other. The valve 334a is provided in the sub-pipe 334. The sub-pipe 336 connects the high-temperature tank 150 and a portion between the first heat exchanger 130 and a connection portion to the sub-pipe 334 in the main pipe 332 to each other. The valve 336a is provided in the sub-pipe 336.

The flow path sectional area of the main pipe 332 is larger than that of the sub-pipe 334. The flow path sectional area of the sub-pipe 334 is larger than that of the sub-pipe 336. Specifically, the flow path sectional area of the main pipe 332 is ½ of the flow path sectional area of the pipe 154 of the high-temperature particle supplier 152. The flow path sectional area of the sub-pipe 334 is ¼ ($½^2$) of the flow path sectional area of the pipe 154. The flow path sectional area of the sub-pipe 336 is ⅛ ($½^3$) of the flow path sectional area of the pipe 154. That is, the main pipe 332 and the sub-pipes 334 and 336 differ in flow rate of the solid particles passing therethrough. For example, when the flow rate of the main pipe 332 is ½, the flow rate of the sub-pipe 334 is ¼, and the flow rate of the sub-pipe 336 is ⅛. The number of the sub-pipes 336 may be two.

The valves 332a, 334a, and 336a are on-off valves. Each of the valves 332a, 334a, and 336a is, for example, the J-valve loop seal described in the above-mentioned second modification example.

The opening and closing of the valves 332a, 334a, and 336a are controlled by the controller 200. The controller 200 is only required to control the opening or closing of any one of or a plurality of valves 332a, 334a, and 336a to adjust the flow rate of the solid particles to be supplied from the high-temperature tank 150 to the first heat exchanger 130.

The energy storage device may further include, when the flow rate of the main pipe 332 is ½, sub-pipes having flow rates of 1/16, 1/32, 1/64, . . . ½$^n$ (two sub-pipes having the flow rate of ½$^n$ may be provided). In this manner, the flow rate of the solid particles to be supplied from the high-temperature tank 150 to the first heat exchanger 130 can be adjusted with higher accuracy.

Fourth Modification Example

Figure 7A:
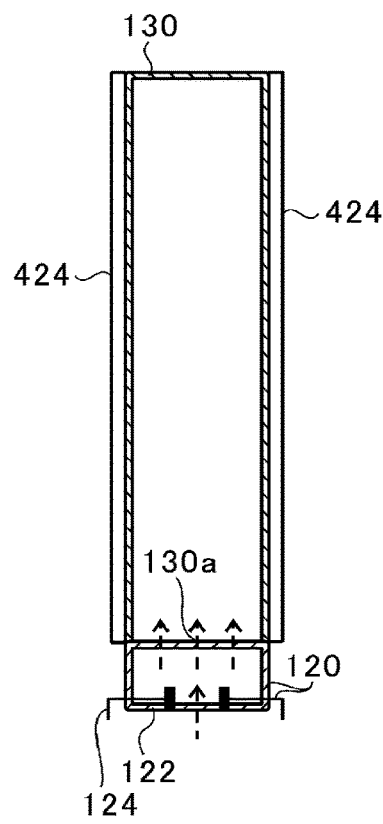
FIG. 7A is a view for illustrating a heater in a fourth modification example.
Figure 7B:
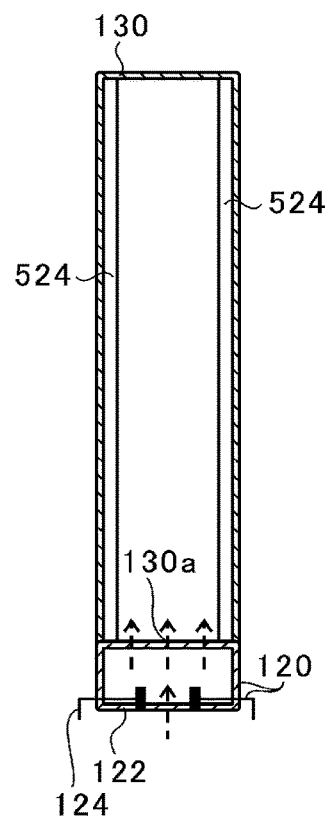
FIG. 7B is a view for illustrating another heater in the fourth modification example.
Figure 7C:
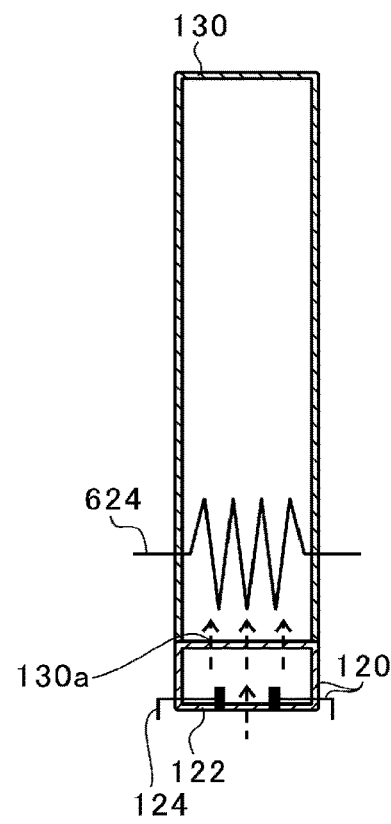
FIG. 7C is a view for illustrating further another heater in the fourth modification example.

FIG. 7A is a view for illustrating a heater 424 in a fourth modification example. FIG. 7B is a view for illustrating another heater 524 in the fourth modification example. FIG. 7C is a view for illustrating further another heater 624 in the fourth modification example. In the fourth modification example, configurations substantially equal to the configurations described in the above-mentioned embodiment are denoted by the same reference symbols, and description thereof is omitted herein.

The heater 424 is an electric heater. As illustrated in FIG. 7A, the heater 424 is provided on an outer wall of the first heat exchanger 130.

The heater 524 is an electric heater. As illustrated in FIG. 7B, the heater 524 is provided on an inner wall of the first heat exchanger 130.

The heater 624 is an electric heater. As illustrated in FIG. 7C, the heater 624 is provided on an inner wall of the first heat exchanger 130.

Each of the heaters 424, 524, and 624 is provided at least at the lower portion of the first heat exchanger 130. The heating temperature of each of the heaters 424, 524, and 624 is lower than the heat resistance temperature of the box member 122 (heat resistance temperature of the distributor of the box member 122).

The drive of each of the heaters 424, 524, and 624 is controlled by the controller 200. Specifically, each of the heaters 424, 524, and 624 is driven in the heat storage mode, and is stopped in the heat radiation mode. When the energy storage device includes any one of the heaters 424, 524, and 624, heat can be efficiently transferred to the solid particles.

Fifth Modification Example

Description has been given of an example of a case in which, in the heat storage mode of the above-mentioned embodiment, the fourth-temperature gas discharged from the low-temperature accommodating portion 160a of the low-temperature tank 160 is supplied to the pressure energy collector 160e. However, in the heat storage mode, the gas discharged from the low-temperature accommodating portion 160a may be supplied to other configurations.

Figure 8:
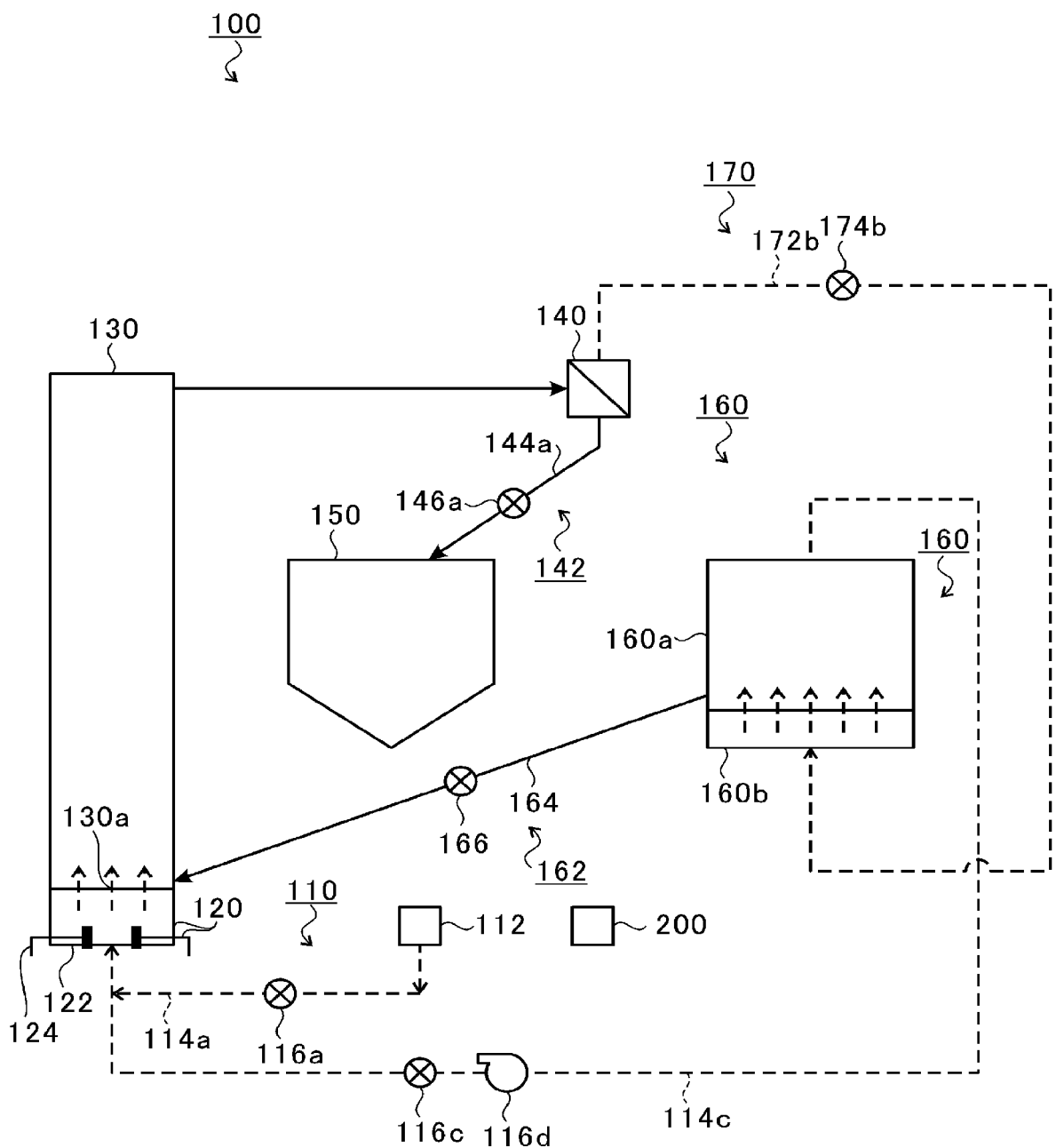
FIG. 8 is a view for illustrating processing to be performed by a controller in a heat storage mode in a fifth modification example.

FIG. 8 is a view for illustrating the processing to be performed by the controller 200 in the heat storage mode in a fifth modification example. For ease of understanding, in FIG. 8, configurations not used in the heat storage mode are omitted.

In the heat storage mode of the fifth modification example, the controller 200 closes the valves 116b, 146b, and 174a and the flow rate adjustment valve 156. The controller 200 stops the fluid supplier 192. Further, as illustrated in FIG. 8, the controller 200 drives the blower 112, 116d, and the heater 124. Further, the controller 200 opens the valves 116a, 116c, 146a, and 174b. The controller 200 opens the flow rate adjustment valve 166 and adjusts an opening degree of the flow rate adjustment valve 166.

In this case, in addition to the gas supplied by the blower 112, the gas discharged from the low-temperature tank 160 (low-temperature accommodating portion 160a) is supplied to the heating chamber 120. That is, the gas supplier 110 causes the gas to pass through the solid particles stored in the low-temperature tank 160, and then supplies the gas to the first heat exchanger 130. In this manner, the gas that has been preheated by the low-temperature tank 160 can be supplied to the first heat exchanger 130. Therefore, the gas supplier 110 can collect the heat of the gas discharged from the first heat exchanger 130, which has not been able to be collected by the solid particles accommodated in the low-temperature accommodating portion 160a.

Sixth Modification Example

Description has been given of an example of a case in which, in the heat radiation mode of the above-mentioned embodiment, the solid particles are supplied to the first heat exchanger 130 only from the high-temperature tank 150. However, solid particles may be supplied to the first heat exchanger 130 from other configurations.

Figure 9:
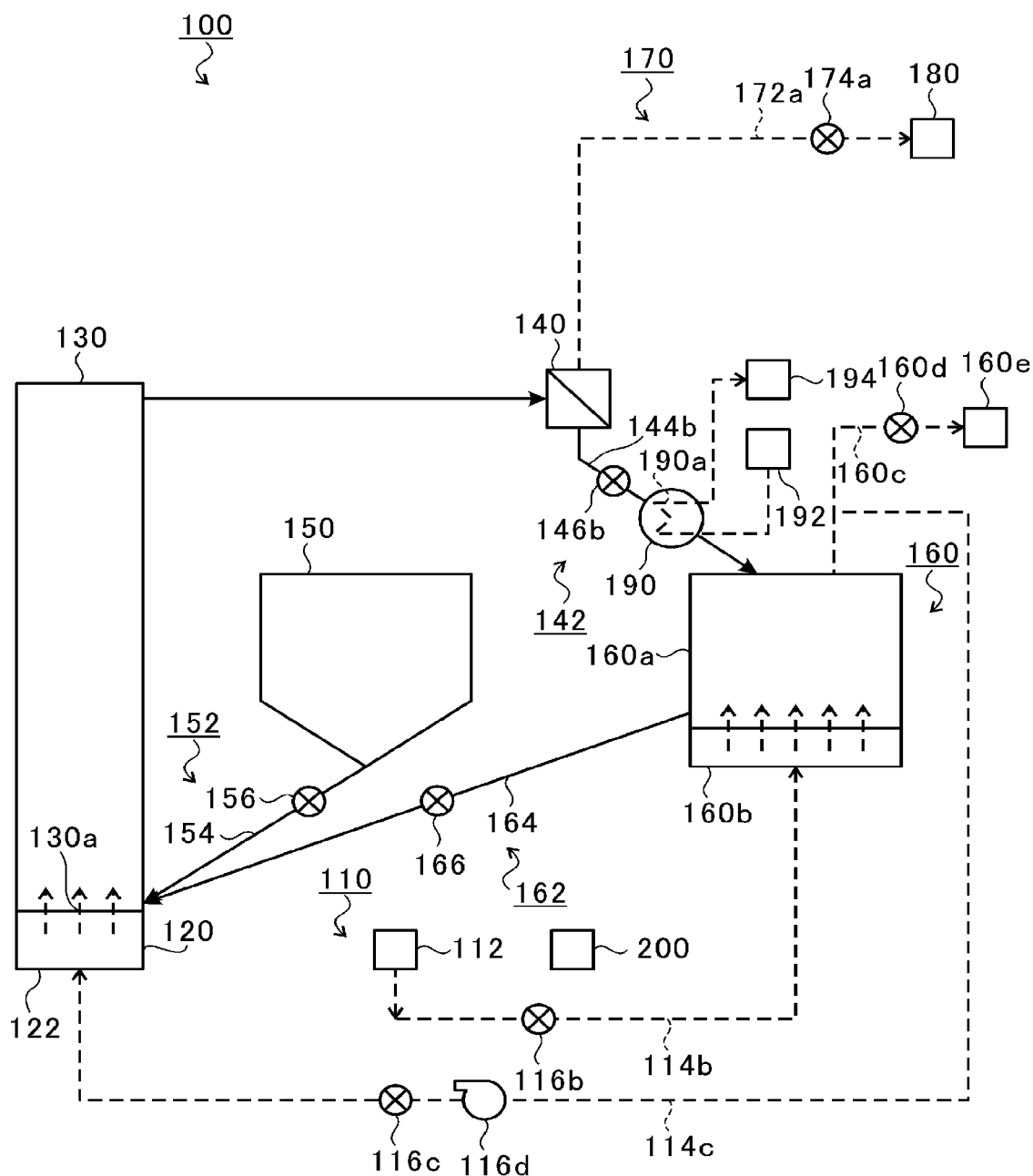
FIG. 9 is a view for illustrating processing to be performed by a controller in a heat radiation mode in a sixth modification example.

FIG. 9 is a view for illustrating the processing to be performed by the controller 200 in the heat radiation mode in a sixth modification example. For ease of understanding, in FIG. 9, configurations not used in the heat radiation mode are omitted.

In the heat radiation mode of the sixth modification example, the controller 200 closes the valves 116a, 146a, and 174b. The controller 200 stops the heater 124. Further, as illustrated in FIG. 9, the controller 200 opens the valves 116b, 116c, 146b, and 174a. Further, the controller 200 opens the flow rate adjustment valves 156 and 166 and adjusts respective opening degrees of the flow rate adjustment valves 156 and 166. The controller 200 drives the blowers 112 and 116d and the fluid supplier 192. That is, the controller 200 in the sixth modification example supplies, in the heat radiation mode, in addition to the solid particles stored in the high-temperature tank 150, solid particles from the low-temperature tank 160 to the first heat exchanger 130 by controlling the low-temperature particle supplier 162.

Further, the controller 200 adjusts the opening degrees of the flow rate adjustment valves 156 and 166 based on the demand temperature and the demand flow rate of the first heat utilization device 180. Specifically, there are determined the amount of the second-temperature solid particles and the amount of the fourth-temperature solid particles for heating the gas to the third temperature when the blower 112 supplies the gas at the demand flow rate of the first heat utilization device 180, and the gas is heated by the second-temperature solid particles stored in the high-temperature tank 150 and the fourth-temperature solid particles stored in the low-temperature tank 160. Therefore, the controller 200 adjusts the opening degree of the flow rate adjustment valve 156 so that the determined amount of second-temperature solid particles are supplied to the first heat exchanger 130. Further, the controller 200 adjusts the opening degree of the flow rate adjustment valve 166 so that the determined amount of fourth-temperature solid particles are supplied to the first heat exchanger 130.

As described above, in the heat radiation mode, the controller 200 supplies the solid particles to the first heat exchanger 130 from the high-temperature tank 150 and the low-temperature tank 160. In this manner, as compared to the case in which the solid particles are supplied only from the high-temperature tank 150, a time period of supplying the solid particles can be extended. That is, the first heat exchanger 130 can extend a time period of exchanging heat between the solid particles and the gas. Therefore, the gas feeder 170 can supply the third-temperature gas to the first heat utilization device 180 for a long time period. As a result, the first heat utilization device 180 can be operated for a long time period.

The embodiment has been described above with reference to the attached drawings, but, needless to say, the present disclosure is not limited to the above-mentioned embodiment. It is apparent that those skilled in the art may arrive at various alternations and modifications within the scope of claims, and those examples are construed as naturally falling within the technical scope of the present disclosure.

For example, in the above-mentioned embodiment, description has been given of an example in which air is supplied as the gas to be supplied by the gas supplier 110. However, the gas to be supplied by the gas supplier 110 is not limited thereto. The gas supplier 110 may supply, for example, carbon dioxide or combustion exhaust gas.

Further, in the above-mentioned embodiment, description has been given of an example of a configuration in which the gas supplier 110 includes the blower 112. However, the configuration of the gas supplier 110 is not limited as long as the gas supplier 110 can supply the gas to the first heat exchanger 130. For example, the gas supplier 110 may include a compressed gas source (for example, compressed air source) or a pump in place of the blower 112.

Further, in the above-mentioned embodiment, description has been given of an example of a configuration in which the gas is supplied from the bottom surface of the first heat exchanger 130. However, the gas (air) is only required to be supplied from a portion lower than a portion for supplying the solid particles of the first heat exchanger 130. For example, the gas (air) may be supplied from a lower portion of the first heat exchanger 130. Further, the gas supplier 110 may supply gas having a normal pressure, or may supply pressurized gas.

Further, in the above-mentioned embodiment, description has been given of an example of a case in which the fluid supplier 192 supplies fluid subjected to heat exchange by the second heat exchanger 190 to the second heat utilization device 194. However, the fluid supplier 192 may supply the fluid subjected to heat exchange by the second heat exchanger 190 to the first heat utilization device 180 in place of or in addition to the second heat utilization device 194.

Further, in the above-mentioned embodiment, description has been given of an example of a configuration in which the low-temperature tank 160 stores the solid particles forming the fluidized bed. In this manner, the gas can be preheated efficiently by the heat of the solid particles in the heat radiation mode. However, the configuration of the low-temperature tank 160 is not limited as long as the low-temperature tank 160 can store the solid particles. The low-temperature tank 160 may be, for example, a hopper. Further, the low-temperature tank 160 may store the solid particles forming a moving bed.

Further, in the above-mentioned embodiment, description has been given of an example of a case in which the high-temperature tank 150 is a hopper. In this manner, heat radiation of the high-temperature solid particles can be suppressed. However, the configuration of the high-temperature tank 150 is not limited as long as the high-temperature tank 150 can store the solid particles. The high-temperature tank 150 may have a configuration in which, for example, similarly to the low-temperature tank 160, the solid particles are stored as the fluidized bed.

Further, in the above-mentioned embodiment, the heat storage mode is performed during a period in which surplus power is generated ("generated power amount"–"demand power amount">"predetermined value" (for example, 0)). However, the heat storage mode may be performed when power is required to be converted into other energy (for example, when power is required to be consumed in order to stabilize the power grid). Further, the heat radiation mode is performed as required. However, the heat radiation mode may be performed when heat is required to be used (for example, when heat is desired to be used in a cement plant).

Further, in the above-mentioned embodiment, description has been given of an example of a configuration in which the energy storage device 100 includes the blower 116d. However, the blower 116d is not a necessary configuration. For example, in the heat radiation mode, the controller 200 is not required to drive the blower 116d. Further, the energy storage device 100 may include a bypass pipe connected to the pipe 114c to bypass the blower 116d. In this case, in the heat storage mode, the controller 200 sets a path through which the gas passes to the path passing through the blower 116d. Further, in the heat radiation mode, the controller 200 sets the path through which the gas passes to the path passing through the bypass pipe.

Further, description has been given of an example of a configuration in which, in the heat radiation mode of the above-mentioned embodiment, the controller 200 adjusts the opening degree of the flow rate adjustment valve 156 based on the demand temperature and the demand flow rate of the first heat utilization device 180. However, the controller 200 may adjust the opening degree of the flow rate adjustment valve 156 based on the demand temperature of the first heat utilization device 180. Similarly, in the sixth modification example, the controller 200 may adjust the opening degrees of the flow rate adjustment valves 156 and 166 based on the demand temperature of the first heat utilization device 180.

Further, in the above-mentioned third modification example, description has been given of an example of a configuration in which two sub-pipes are provided. However, the number of sub-pipes is not limited thereto. The sub-pipes are only required to have different pipe diameters.

Further, the energy storage device 100 may include one or a plurality of heaters 124, 424, 524, and 624.

INDUSTRIAL APPLICABILITY

The present disclosure is applicable to an energy storage device.

What is claimed is:

1. An energy storage device, including:
a first heat exchanger to be supplied with gas from a gas supply port formed in a bottom surface or a lower portion of the first heat exchanger, and to be supplied with solid particles from above the gas supply port, the first heat exchanger being configured to exchange heat between the gas and the solid particles;
a gas supplier configured to supply the gas to the first heat exchanger;
a heater configured to consume power to heat any one of or both of the gas fed from the gas supplier to be supplied to the first heat exchanger and the gas present in the first heat exchanger;
a solid-gas separator configured to separate the gas and the solid particles in a solid-gas mixture discharged from the first heat exchanger;
a high-temperature tank and a low-temperature tank each configured to store the solid particles separated by the solid-gas separator;
a first heat utilization device configured to use thermal energy of the gas separated by the solid-gas separator;
a high-temperature particle supplier configured to supply the solid particles stored in the high-temperature tank to the first heat exchanger; and
a low-temperature particle supplier configured to supply the solid particles stored in the low-temperature tank to the first heat exchanger.

2. The energy storage device according to claim 1, further comprising a controller configured to control the gas supplier, the heater, and the low-temperature particle supplier, wherein the controller is configured to, in a heat storage mode:
control the gas supplier to supply the gas to the first heat exchanger;
drive the heater to heat the gas; and
control the low-temperature particle supplier to supply the solid particles from the low-temperature tank to the first heat exchanger, so that the solid particles are heated by the gas in the first heat exchanger, and the solid particles separated by the solid-gas separator are supplied to the high-temperature tank.

3. The energy storage device according to claim 2, wherein the controller is configured to, in the heat storage mode, adjust an amount of the solid particles to be supplied by the low-temperature particle supplier based on a predetermined surplus power amount.

4. The energy storage device according to claim 2, wherein the gas supplier is configured to, in the heat storage mode, cause the gas to pass through the solid particles stored in the low-temperature tank, and then supply the gas to the first heat exchanger.

5. The energy storage device according to claim 1, further comprising a controller configured to control the gas supplier, the heater, and the high-temperature particle supplier, wherein the controller is configured to, in a heat radiation mode:
stop the heater;
control the gas supplier to supply the gas to the first heat exchanger; and
control the high-temperature particle supplier to supply the solid particles from the high-temperature tank to the first heat exchanger, so that the gas is heated by the solid particles in the first heat exchanger, the solid particles separated by the solid-gas separator are supplied to the low-temperature tank, and the gas separated by the solid-gas separator is supplied to the first heat utilization device.

6. The energy storage device according to claim 5, wherein the gas supplier is configured to, in the heat radiation mode, cause the gas to pass through the solid particles stored in the low-temperature tank, and then supply the gas to the first heat exchanger.

7. The energy storage device according to claim 5, wherein the controller is configured to, in the heat radiation mode, adjust an amount of the solid particles to be supplied by the high-temperature particle supplier based on a demand temperature of the gas required by the first heat utilization device.

8. The energy storage device according to claim 5, wherein the controller is configured to, in the heat radiation mode, control the low-temperature particle supplier to supply the solid particles from the low-temperature tank to the first heat exchanger.

9. The energy storage device according to claim 3, wherein any one of or both of the high-temperature particle supplier and the low-temperature particle supplier include:
a plurality of pipes that differ in flow rates of solid particles passing therethrough; and
a plurality of valves provided in the plurality of pipes, respectively, and
wherein the controller is configured to control opening and closing of each of the plurality of valves.

10. The energy storage device according to claim 1, wherein the low-temperature tank includes:
- a low-temperature accommodating portion for accommodating the solid particles; and
- a fluidizing gas supplier configured to supply fluidizing gas from a bottom surface or a lower portion of the low-temperature accommodating portion.

11. The energy storage device according to claim 1, wherein the heater is provided at any one of or both of a wall of the first heat exchanger and an interior of the first heat exchanger.

12. The energy storage device according to claim 1, further comprising:
- a second heat exchanger configured to exchange heat between fluid and the solid particles separated by the solid-gas separator; and
- a fluid supplier configured to supply the fluid subjected to heat exchange by the second heat exchanger to any one of or both of the first heat utilization device and a second heat utilization device,
- wherein the low-temperature tank is configured to store the solid particles subjected to heat exchange by the second heat exchanger.

13. The energy storage device according to claim 1, wherein the heater is configured to consume power generated by any one of or both of a power generation system using renewable energy and a power generation system using a turbine generator.

* * * * *